April 6, 1954  E. H. RUSCH  2,674,681
HEATING APPARATUS
Filed Oct. 18, 1950
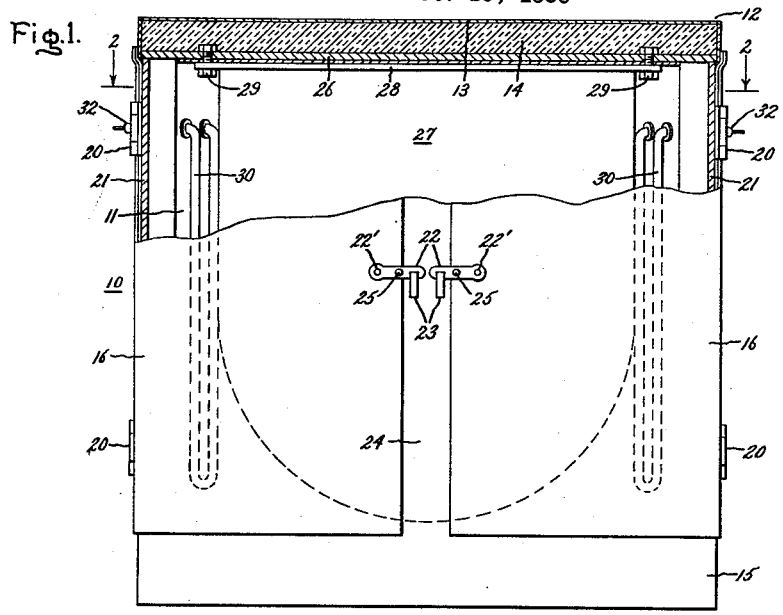
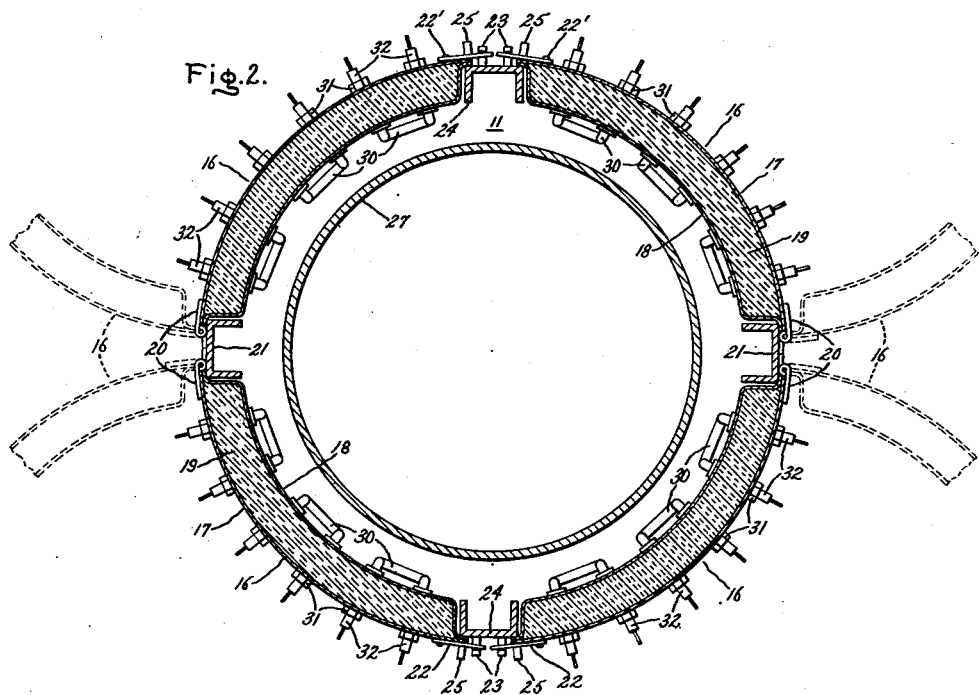
Inventor:
Ernest H. Rusch,
by Crowell S. Mack
His Attorney.

Patented Apr. 6, 1954

2,674,681

UNITED STATES PATENT OFFICE 2,674,681

HEATING APPARATUS

Ernest H. Rusch, Teaneck, N. J., assignor to General Electric Company, a corporation of New York Application October 18, 1950, Serial No. 190,696

2 Claims. (Cl. 219—43)

This invention relates to heating apparatus and more particularly to heating apparatus of the enclosed chamber type for heating materials which may have an exothermic reaction.

Heretofore in the heating of materials such as varnish and chemicals which might have an exothermic reaction, a common arrangement was to put the materials in kettles on wheels and tracks so that the kettles could be rolled over pits containing coke or coal fires. As the kettles approached temperatures at which a reaction might take place, the operators could easily wheel them off the fire and when necessary blow air over the kettles or use other cooling means for removing heat which was generated by the reaction.

More recently, in an endeavor to secure increased efficiency, gas fired and electrically heated furnaces having heavily insulated enclosures have been used. In such a furnace, the kettle containing the liquid to be heated is located within an enclosed heating chamber, which means that if an exothermic reaction takes place it is very difficult, if not impossible, to cool the kettle rapidly. As a result, a fire sometimes occurs.

The principal object of the present invention is to provide a heating apparatus of the enclosed chamber type from which the source of heat may be quickly removed when necessary.

A further object of the invention is to provide in a heating apparatus of this type for the removal of the heat generated by an exothermic reaction, either to the surrounding atmosphere by radiation and convection, or by other means.

Other objects and advantages of the invention will be apparent as the invention is hereinafter disclosed in detail.

In carrying out the invention in one form, an enclosed heating chamber is provided having a plurality of hinged wall sections for quickly opening the chamber to the surounding atmosphere. Electrical heating units for the chamber are mounted on the inner surfaces of the hinged wall sections so that when the hinged sections are opened the heating units are quickly removed from heating relation with the material being heated in the chamber.

For a clearer and more complete understanding of my invention, reference should be had to the accompanying drawing in which Fig. 1 is a side elevation view partially in section of a preferred embodiment thereof, while Fig. 2 is a top view in section along the line 2—2 of Fig. 1.

Referring to the drawing, there is shown a heating apparatus which is designated generally by the numeral 10. The apparatus 10 is cylindrical in form and comprises a plurality of thermally insulated walls forming a heating chamber 11. The top wall 12 of the apparatus comprises an outer metal shell 13 enclosing a layer 14 of heat insulating material. The bottom wall 15 of the apparatus is thermally insulated and similar in construction to the top wall 12.

The circular side wall of the apparatus is composed principally of four hinged wall sections 16. Each section 16 comprises an outer metal shell 17 and an inner metal shell 18 with an intermediate layer 19 of heat insulating material. Each of the movable wall sections 16 is connected by means of a pair of hinges 20 to a fixed supporting member, viz., rigid vertical angle member 21. Each of the wall sections 16 has a latch arm 22 which engages a latch 23 secured to a fixed supporting member, viz., rigid vertical angle member 24. Each of the latch arms 22 is pivoted at a point 22' on its respective wall section 16 and is provided with a knob 25 for the operation thereof.

Latches 22, 23 maintain hinged wall sections 16 closed during normal operation, thus providing a completely enclosed thermally insulated heating chamber 11. When necessary, latches 22, 23 can be released and sections 16 quickly opened to the positions indicated by the dotted lines in Fig. 2. This opens the heating chamber to the surrounding atmosphere and permits the escape of heat from the chamber, and also redirects any radiant heat from the movable walls and the heating units thereon away from the material in the chamber.

Just below the upper wall 12 there is provided a circular metal plate 26 which is supported at intervals of 90 degrees around the perimeter of the heating apparatus by vertical angle members 21 and 24. Member 26 in turn supports a kettle 27 in the embodiment of the invention illustrated in the accompanying drawing. Kettle 27 is provided with a flanged portion 28 around the upper margin thereof and the flange 28 is secured to supporting member 26 in a suitable manner such as by a plurality of bolts 29.

In the embodiment illustrated, the chamber 11 is heated by means of electrical heating units 30 positioned at intervals around the chamber on hinged wall sections 16. As shown, these electrical heating units are U-shaped and vertically disposed around the heating chamber with right angle portions 32 of the heating units extending through wall sections 16 near the upper margins thereof to provide for external electrical connections. The heating units 30 are preferably of the enclosed metal sheathed type in which a resistance heating conductor is enclosed within a metal sheath and separated therefrom by means of an electrically insulating, heat conducting material such as compacted magnesium oxide powder. Suitable bushings 31 may be provided for sealing the openings in wall sections 16 through which the projecting portions 32 of the heating units 30 project.

This construction, with the heating units mounted on the doors 16, makes possible the rapid removal of the heating units from heating relation with the material in chamber 11, merely by opening the doors to positions such as those illustrated by the dotted lines in Fig. 2.

It will be understood that the heating apparatus 10 is provided with an inlet opening, an outlet pipe, and external pumps and piping for putting liquid materials to be heated into kettle 27 and removing them again after the heating operation. These features do not form a part of the present invention and are not shown on the accompanying drawing in order to simplify it.

It will be apparent from the foregoing description that the applicant's invention provides a heating apparatus for materials which may have have an exothermic reaction which is completely enclosed and well insulated and, therefore, efficient during operation, but which provides for the quick removal of the source of heat when necessary. After the doors are opened to remove the source of heat from the heating chamber the charge therein can be allowed to cool in the atmosphere at room temperature or, if desired, other methods such as blowing air against the kettle can be used in order to accelerate the cooling of the material in the kettle.

It will be understood that the present invention is not limited to a cylindrical construction as illustrated and described herein, nor is it limited to the heating of liquid materials in a kettle, as other types of materials either with or without a container may be heated with equal facility. Also, the invention is not limited to the use of electrical heating means as other heating means may also be used.

It will be understood also that my invention is adaptable for the use of automatic equipment responsive to the chamber temperature for both opening the doors and applying forced cooling to the material in the chamber, if desired.

In some cases it may be desirable to use fixed heating units in the heating chamber, on the bottom wall 15, for example, to supplement the movable heating units on the doors 16, and this may also be done without departing from my invention.

Therefore, while I have illustrated and described a preferred embodiment of my invention, it is not limited to this embodiment and I intend to cover by the appended claims any modifications which fall within the true spirit and scope of my invention.

What I claim as new and desire to secure by Letters Patent of the United States is:

1. A heating apparatus comprising a plurality of first fixed vertical supporting members each having a hinge means attached thereto, a plurality of second fixed vertical supporting members each having a latching device attached thereto, all of said first and second fixed vertical supporting members being disposed in spaced parallel relation to each other on the periphery of an imaginary cylindrical surface, said imaginary cylindrical surface defining a space with said first and second fixed vertical supporting members, a circular plate traversing said space and supported by said first and second fixed vertical supporting members, a cylindrical kettle supported by said circular plate in said space, a plurality of wall sections, each of said wall sections being attached at one end thereof to one of said hinge means, said wall sections being adapted to close and form an enclosed heating chamber around said kettle, and a plurality of heating units spaced at intervals around said heating chamber on the inner surfaces of said wall sections, each of said wall sections having a latch member movably mounted at the unhinged end thereof to interact with the said latching device attached to the fixed vertical supporting member adjacent to the said unhinged end in the closed position, whereby said wall sections may be opened to remove all of said heating units from heating relationship with said kettle or may be closed to bring all of said heating units into heating relationship with said kettle.

2. A heating apparatus comprising a bottom wall member, a plurality of first fixed vertical supporting members each having a hinge means attached thereto, a plurality of second fixed vertical supporting members each having a latching device attached thereto, all of said first and second fixed vertical supporting members being disposed in spaced parallel relation to each other on the periphery of an imaginary cylindrical surface of which said bottom wall member comprises the base, said imaginary cylindrical surface defining a space with said first and second fixed vertical supporting members, a circular plate traversing said space and supported by said first and second fixed vertical supporting members, a top wall member attached to and covering said plate, a cylindrical kettle supported by said circular plate in said space, a plurality of arcuate wall sections, each of said wall sections being attached at one vertical edge thereof to one of said hinge means, said wall sections being adapted to close and form together with said circular plate and said bottom wall member an enclosed heating chamber around said kettle, said top and bottom wall members and said wall sections each having an integral insulating layer, and a plurality of heating units spaced at intervals around said heating chamber on the inner surfaces of said wall sections, each of said wall sections having a latch member movably mounted at the unhinged vertical edge thereof to interact with the said latching device attached to the fixed vertical supporting member adjacent to the said unhinged vertical edge in the closed position, whereby said wall sections may be opened to remove all of said heating units from heating relationship with said kettle so as to allow convective or forced air cooling of said kettle, or may be closed to bring all of said heating units into heating relationship with said kettle.

References Cited in the file of this patent

UNITED STATES PATENTS

| Number | Name | Date |
|---|---|---|
| 1,730,042 | Pendleton et al. | Oct. 1, 1929 |
| 1,971,387 | Scoville | Aug. 28, 1934 |
| 2,436,722 | Liddell et al. | Feb. 24, 1948 |
| 2,482,665 | Geyer | Sept. 20, 1949 |
| 2,500,241 | Brown | Mar. 14, 1950 |

FOREIGN PATENTS

| Number | Country | Date |
|---|---|---|
| 468,025 | Germany | Nov. 5, 1928 |
| 523,785 | Great Britain | July 23, 1940 |
| 612,179 | Great Britain | Nov. 9, 1948 |